United States Patent
Akkarakaran et al.

(10) Patent No.: US 11,729,744 B2
(45) Date of Patent: Aug. 15, 2023

(54) DETERMINING NUMEROLOGY FOR SIDELINK COMMUNICATION

(71) Applicant: QUALCOMM Incorporated, San Diego, CA (US)

(72) Inventors: Sony Akkarakaran, Poway, CA (US); Tao Luo, San Diego, CA (US); Junyi Li, Chester, NJ (US); Jung Ho Ryu, Fort Lee, NJ (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 16/920,298

(22) Filed: Jul. 2, 2020

(65) Prior Publication Data
US 2021/0007082 A1    Jan. 7, 2021

Related U.S. Application Data

(60) Provisional application No. 62/870,636, filed on Jul. 3, 2019.

(51) Int. Cl.
*H04W 72/04* (2023.01)
*H04W 56/00* (2009.01)

(52) U.S. Cl.
CPC ....... *H04W 72/04* (2013.01); *H04W 56/0005* (2013.01)

(58) Field of Classification Search
CPC . H04W 72/04; H04W 56/0005; H04W 16/00; H04W 36/06; H04W 72/12; H04B 7/024; H04L 1/001; H04L 5/00
See application file for complete search history.

(56) References Cited

U.S. PATENT DOCUMENTS

| | | | |
|---|---|---|---|
| 2020/0178221 A1* | 6/2020 | Byun | H04W 4/08 |
| 2020/0235887 A1 | 7/2020 | Hou et al. | |
| 2022/0116821 A1* | 4/2022 | Wei | H04L 27/2636 |

FOREIGN PATENT DOCUMENTS

CN         109963265 A        7/2019

OTHER PUBLICATIONS

"3rd Generation Partnership Project; Technical Specification Group Radio Access Network; NR; Radio Resource Control (RRC) protocol specification (Release 15)", 3GPP Standard, Technical Specification; 3GPP TS 38.331, 3rd Generation Partnership Project (3GPP), Mobile Competence Centre, 650, Route Des Lucioles; F-06921 Sophia-Antipolis Cedex; France, vol. RAN WG2, No. V15.6.0, Jun. 29, 2019, pp. 1-519, XP051754472, [retrieved on Jun. 29, 2019].

(Continued)

*Primary Examiner* — Ian N Moore
*Assistant Examiner* — Brian T Le
(74) *Attorney, Agent, or Firm* — Patterson + Sheridan, LLP

(57) ABSTRACT

Certain aspects of the present disclosure provide methods and apparatus for selecting numerology for sidelink synchronization signals. When one or more user equipment (UE) are in various modes of network signaling with a base station (BS), a first UE may determine a mode of network signaling between the first UE and the BS. The UE may then determine a first numerology based on the mode, and receive, from a second UE, a sidelink signal having a subcarrier spacing corresponding to the first numerology.

22 Claims, 8 Drawing Sheets

(56) References Cited

OTHER PUBLICATIONS

"3rd Generation Partnership Project; Technical Specification Group Radio Access Network; NR; Study on NR Vehicle-to-Everything (V2X) (Release 16)", 3GPP Standard; Technical Report; 3GPP TR 38.885, 3rd Generation Partnership Project (3GPP), Mobile Competence Centre, 650, Route Des Lucioles, F-06921, Sophia-Antipolis Cedex, France, No. V16.0.0, Mar. 28, 2019 (Mar. 28, 2019), pp. 1-122, XP051723188, [retrieved on Mar. 28, 2019] Whole section 5.2.

International Search Report and Written Opinion—PCT/US2020/040807—ISA/EPO—dated Oct. 15, 2020.

VIVO: "Sidelink Synchronization Mechanism", 3GPP Draft, 3GPP TSG RAN WG1 #97, R1-1907689, Sidelink Synchronization Mechanism, 3rd Generation Partnership Project (3GPP), Mobile Competence Centre, 650, Route Des Lucioles, F-06921, Sophia-Antipolis Cedex, France, vol. RAN WG1, No. Reno, USA; May 13, 2019-May 17, 2019, May 16, 2019 (May 16, 2019), XP051739976, 12 pages, Retrieved from the Internet: URL: http://www.3gpp.org/ftp/tsg%5Fran/WG1%5FRL1/TSGR1%5F97/Docs/R1%2D1907689%2Ezip [retrieved on May 16, 2019] Sections 2.4 and 2.8.

\* cited by examiner

DETERMINING NUMEROLOGY FOR SIDELINK COMMUNICATION

CROSS-REFERENCE TO RELATED APPLICATION(S)

This application claims benefit of and priority to U.S. Provisional Application No. 62/870,636, filed Jul. 3, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for determining sidelink synchronization signal numerology.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipment (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects describe a method of sidelink communication at a first user equipment (UE). In some examples, the method includes determining a mode of network signaling between the first UE and a base station (BS). In some examples, the method includes, determining a first numerology based on the mode. In some examples, the method includes, receiving, from a second UE, a sidelink signal having a subcarrier spacing corresponding to the first numerology.

Certain aspects describe a first user equipment (UE). In some examples, the first UE includes a memory and a processor coupled to the memory. In some examples, the processor and the memory are configured to determine a mode of network signaling between the first UE and a base station (BS). In some examples, the processor and the memory are configured to determine a first numerology based on the mode. In some examples, the processor and the memory are configured to receive, from a second UE, a sidelink signal having a subcarrier spacing corresponding to the first numerology.

Certain aspects describe a non-transitory computer-readable storage medium that stores instructions that when executed by a processor of an apparatus cause the apparatus to perform a method of sidelink communication at a first user equipment (UE). In some examples, the method includes determining a mode of network signaling between the first UE and a base station (BS). In some examples, the method includes determining a first numerology based on the mode. In some examples, the method includes receiving, from a second UE, a sidelink signal having a subcarrier spacing corresponding to the first numerology.

Certain aspects describe a first user equipment (UE). In some examples, the first UE includes means for determining a mode of network signaling between the first UE and a base station (BS). In some examples, the first UE includes means for determining a first numerology based on the mode. In some examples, the first UE includes means for receiving, from a second UE, a sidelink signal having a subcarrier spacing corresponding to the first numerology.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
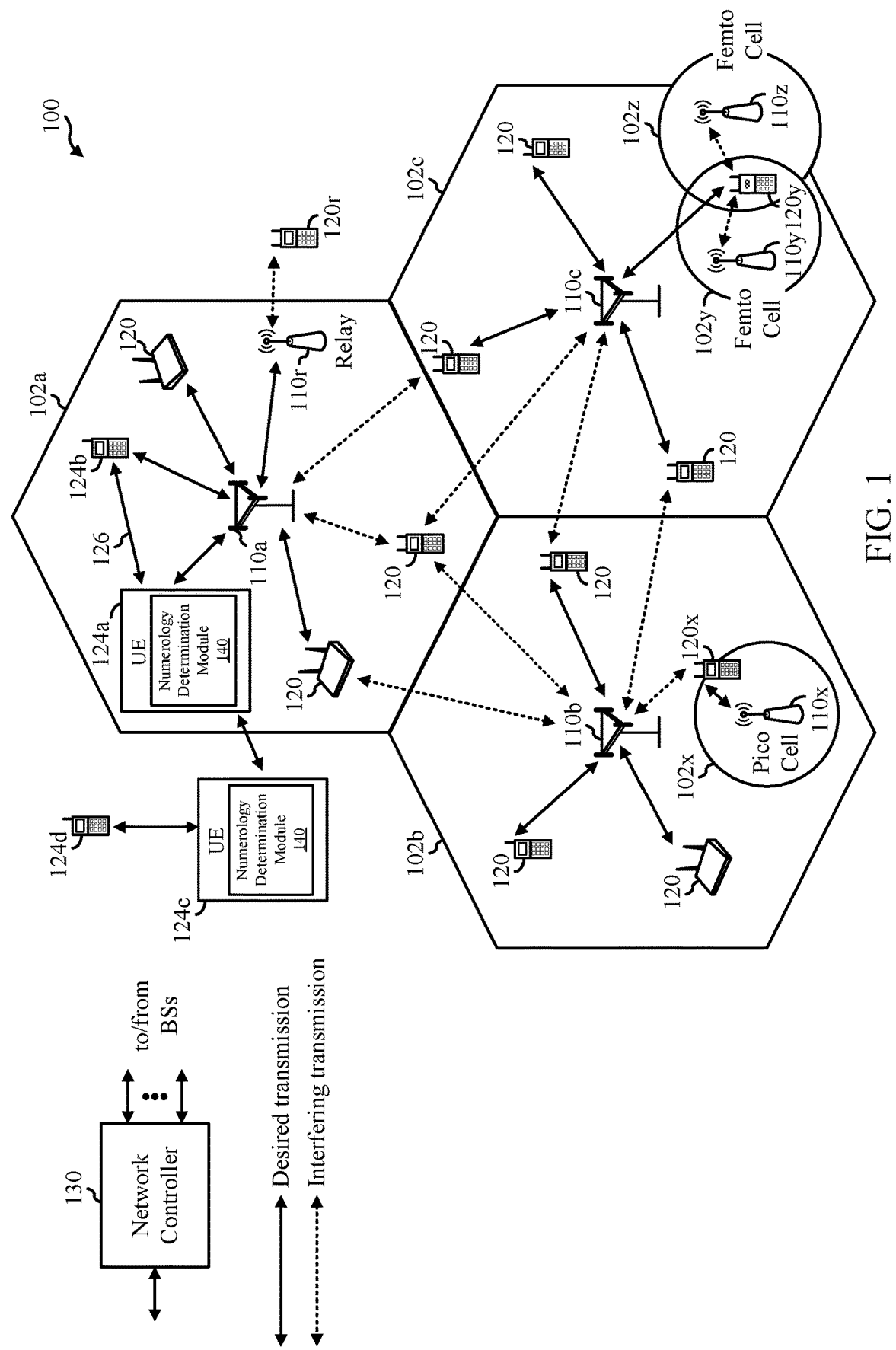
FIG. 1 is a block diagram conceptually illustrating an example telecommunications system, in accordance with certain aspects of the present disclosure.

Aspects of the present disclosure provide apparatus, methods, processing systems, and computer readable mediums for determining sidelink synchronization signal numerology by a user equipment (UE).

5G new radio (NR) supports a wide range of communication scenarios over multiple frequency ranges. For example, frequency range 1 (FR1) includes 0.45-6 GHz frequency bands, and FR2 includes 24.25-52.6 GHz. Bands in FR2 include millimeter wave (mmW) frequencies and have shorter range but higher available bandwidth than bands in the FR1. To support these communication scenarios, the fixed numerology of LTE has been replaced with a scalable numerology with a range of subcarrier spacing. However, this can create problems for a first UE trying to initiate a sidelink communication with another UE. For example, the first UE may not be aware of the numerology for sidelink synchronization signals in the other UE, preventing the first UE from initiating the sidelink.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2).

NR is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be a NR system (e.g., a 5G NR network). In the example shown in FIG. 1, a first UE 124a and a second UE 124c include a numerology determination module 140 that may be configured for determining numerology for sidelink synchronization signals, according to aspects described herein. As shown, the first UE 124a and the second UE 124c may be in various modes of communication with a base station (BS) 110 (e.g., network signaling). In this example, the numerology determination module 140 may enable the UE 124a to initiate a sidelink communication with one or more of UE 124b, the second UE 124c, or another UE 124d, based on the mode of communication. It should be noted that any of UEs 124a-124d or UE 120 may include the numerology determination module 140.

As illustrated in FIG. 1, the wireless communication network 100 may include a number of base stations (BSs) 110 and other network entities. A BS may be a station that communicates with UEs. Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smartjewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, vehicle to everything (V2X) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or base station), even though the scheduling entity may be utilized for scheduling and/or control purposes. In some examples, the sidelink signals may be communicated using a licensed spectrum (unlike wireless local area networks, which typically use an unlicensed spectrum).

In some examples of the wireless communication network 100, sidelink communication may be established between UEs without necessarily relying on UE ID or control information from a base station. For example, UE 124c may initiate a sidelink communication with UE 124a without relying on a direct connection with a base station (e.g., base station 110a) if the UE 124c is outside of call 102a range. Any of the UEs (124a-124c) may function as a scheduling entity or a primary sidelink device, while the other UE may function as a subordinate entity or a non-primary (e.g., secondary) sidelink device. Further, the UEs (124a-124c) may be configured to perform beam management procedures for a sidelink as described throughout the disclosure. Accordingly, one or more of the UEs may function as a scheduling entity in a device-to-device (D2D), peer-to-peer (P2P), or vehicle-to-vehicle (V2V) network, and/or in a mesh network to initiate and/or schedule certain beam management procedures.

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
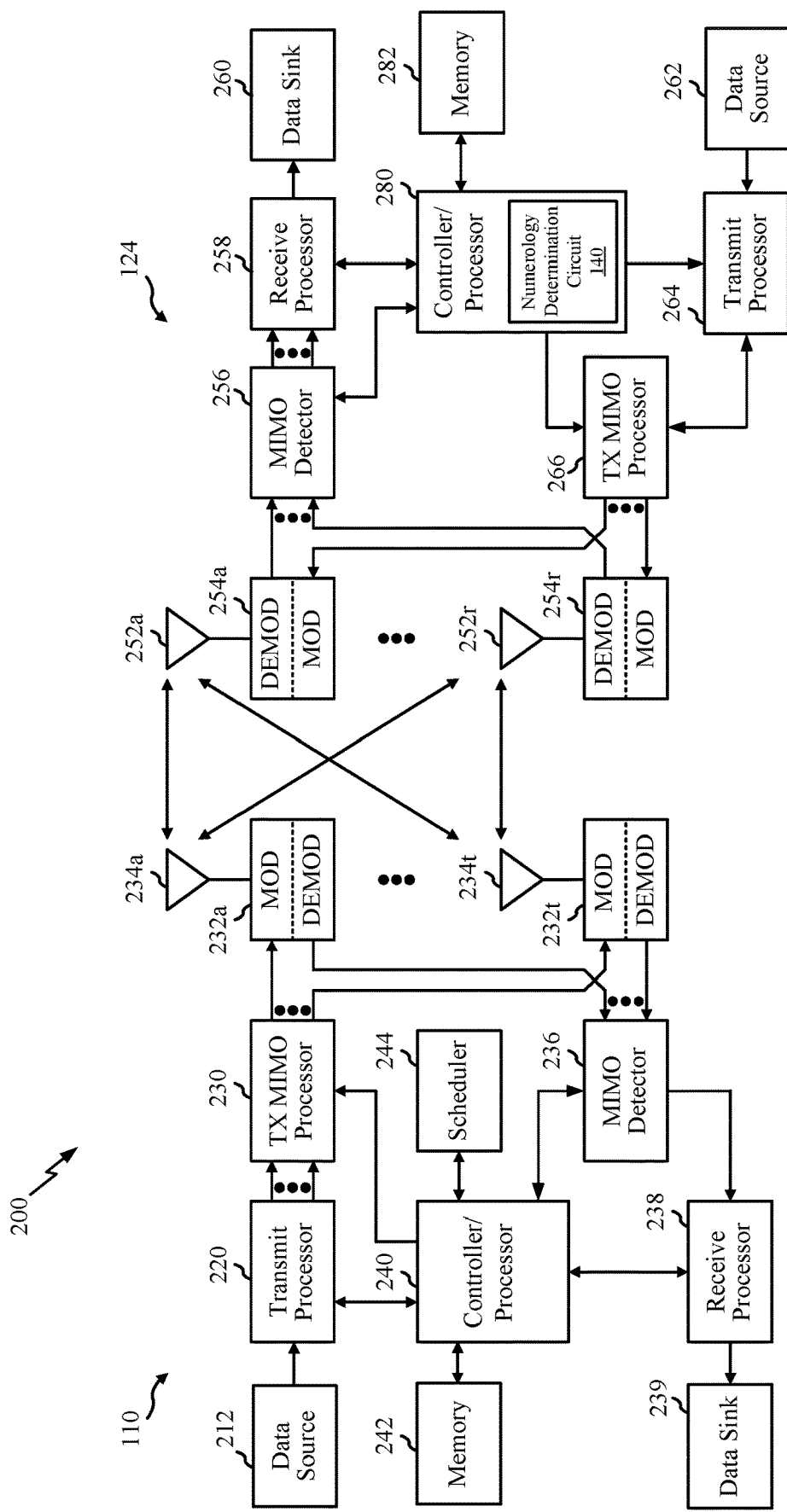
FIG. 2 is a block diagram conceptually illustrating a design of an example base station and user equipment (UE), according to aspects of the present disclosure.

FIG. 2 illustrates example components 200 of BS 110 and UE 124 (e.g., in the wireless communication network 100 of FIG. 1), which may be used to implement aspects of the present disclosure. For example, antennas 252, processors 266, 258, 264, and/or controller/processor 280 of the UE 124 and/or antennas 234, processors 220, 230, 238, and/or controller/processor 240 of the BS 110 may be used to perform the various techniques and methods described herein. In the example shown in FIG. 2, a UE 124 includes a numerology determination circuit 140 that may be configured for determining numerology for sidelink synchronization signals, according to aspects described herein. The numerology determination circuit 140 may enable the UE 124 to initiate a sidelink communication with another UE based on the mode of network signaling between the UE 124 and the BS 110.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 124, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 124 to a data sink 260, and provide decoded control information to a controller/processor 280.

On the uplink, at UE 124, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 124 may be received by the antennas 234, processed by the modulators 232, detected by a MIMO detector 236 if applicable, and further processed by a receive processor 238 to obtain decoded data and control information sent by the UE 124. The receive processor 238 may provide the decoded data to a data sink 239 and the decoded control information to the controller/processor 240.

The controllers/processors 240 and 280 may direct the operation at the BS 110 and the UE 124, respectively. The controller/processor 240 and/or other processors and modules at the BS 110 may perform or direct the execution of processes for the techniques described herein. The memories 242 and 282 may store data and program codes for BS 110 and UE 124, respectively. A scheduler 244 may schedule UEs for data transmission on the downlink and/or uplink.

Figure 3:
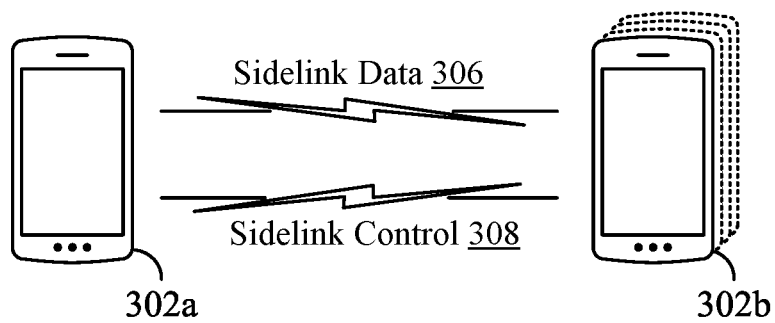
FIG. 3 is a diagram conceptually illustrating an example of a first UE communicating with one or more other UEs according to aspects of the present disclosure.

FIG. 3 is a diagram conceptually illustrating a sidelink communication between a first UE 302a and one or more second UEs 302b (collectively, "second UE 302b"). In various examples, any one of the first UE 302a and the second UE 302b may correspond to a UE or other suitable node in the wireless communication network 100. For example, any one of the first UE 302a and the second UE 302b may correspond to UE 120, or UE 124a-124d.

In some examples, the first UE 302a and the second UE 302b may utilize sidelink signals for direct D2D communication. The D2D communication may use the downlink/uplink WWAN spectrum. The D2D communication may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

Sidelink signals may include sidelink data 306 (i.e., sidelink traffic) and sidelink control information 308. Broadly, the first UE 302a and one or more a second UEs 302b may communicate sidelink data 306 and sidelink control information 308 using one or more data channels and control channels. In some aspects, data channels include a physical sidelink shared channel (PSSCH) and/or sidelink shared channel (SL-SCH). In some aspects, control channels include a physical sidelink control channel (PSCCH) and/or physical sidelink feedback channel (PSFCH).

Sidelink control information 308 may include a source transmit signal (STS), a direction selection signal (DSS), and a destination receive signal (DRS). The DSS/STS may provide for a UE 302 (e.g., 302a, 302b) to request a duration of time to keep a sidelink channel available for a sidelink signal; and the DRS may provide for the UE 302 to indicate the availability of the sidelink channel, e.g., for a requested duration of time. Accordingly, the first UE 302a and the second UE 302b may negotiate the availability and use of sidelink channel resources prior to communication of sidelink data 306 information.

In some configurations, any one or more of the first UE 302a or the second UE 302b may be responsible for initiating and/or scheduling traffic in a D2D communication, including the communication of sidelink data 306 and sidelink control information 308, and maintenance of the sidelink communication channel(s). For example, the first UE 302a may be responsible for scheduling and/or initiating beam management procedures (e.g., initial beam selection procedures, beam sweeping procedures, beam refinement procedures, etc.) between the first UE 302a and the second UE 302b, as disclosed herein. In this example, the second UE 302b receives scheduling control information, including but not limited to beam management scheduling information, synchronization or timing information, or other control information.

The channels or carriers illustrated in FIG. 3 are not necessarily all of the channels or carriers that may be utilized between a first UE 302a and a second UE 302b in a sidelink communication, and those of ordinary skill in the art will recognize that other channels or carriers may be utilized in addition to those illustrated, such as other data, control, and feedback channels.

Figure 4:
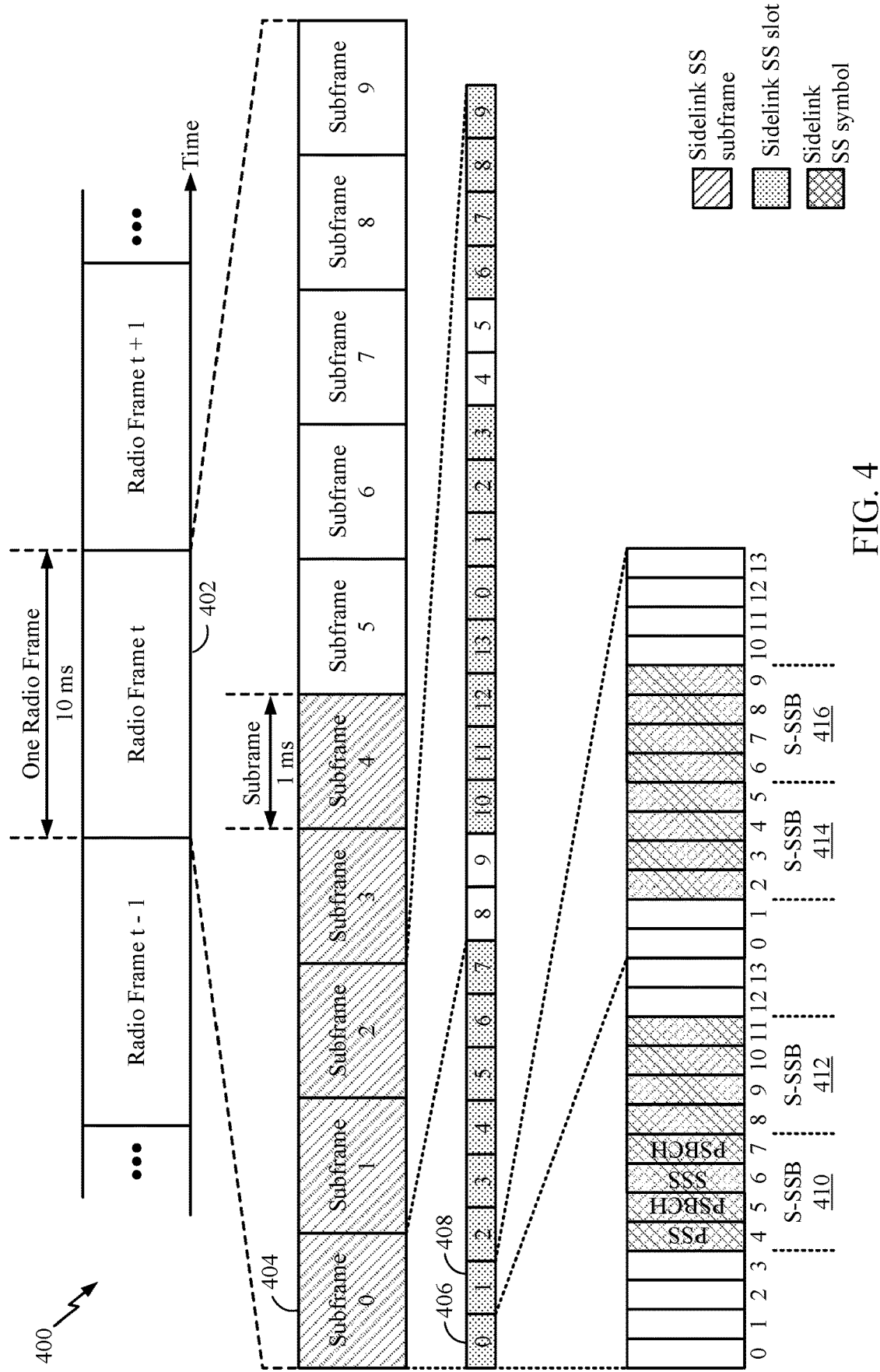
FIG. 4 is a diagram illustrating an example frame format, in accordance with certain aspects of the present disclosure.

FIG. 4 is a diagram showing an example of a frame format 400. The transmission timeline for each data transmission and reception may be partitioned into units of radio frames 402. In NR, the basic transmission time interval (TTI) may be referred to as a slot. In NR, a subframe may contain a variable number of slots (e.g., 1, 2, 4, 8, 16, . . . , N slots) depending on the subcarrier spacing (SCS). NR may support a base SCS of 15 KHz and other SCS may be defined with respect to the base SCS (e.g., 30 kHz, 60 kHz, 120 kHz, 240 kHz, etc.). In the example shown in FIG. 4, the SCS is 120 kHz. As shown in FIG. 4, the subframe 404 (subframe 0) contains 8 slots (slots 0, 1, . . . , 7) with a 0.125 ms duration. The symbol and slot lengths scale with the subcarrier spacing. Each slot may include a variable number of symbol (e.g., OFDM symbols) periods (e.g., 7 or 14 symbols) depending on the SCS. For the 120 kHz SCS shown in FIG. 4, each of the slot 406 (slot 0) and slot 408 (slot 1) includes 14 symbol periods (slots with indices 0, 1, . . . , 13) with a 0.25 ms duration.

In sidelink, a sidelink synchronization signal block (S-SSB), referred to as the SS block or SSB, is transmitted. The SSB may include a primary SS (PSS), a secondary SS (SSS), and/or a two symbol physical sidelink broadcast channel (PSBCH). In some examples, the SSB can be transmitted up to sixty-four times with up to sixty-four different beam directions. The up to sixty-four transmissions of the SSB are referred to as the SS burst set. SSBs in an SS burst set may be transmitted in the same frequency region, while SSBs in different SS bursts sets can be transmitted in different frequency regions.

In the example shown in FIG. 4, in the subframe 404, SSB is transmitted in each of the slots (slots 0, 1, . . . , 7). In the example shown in FIG. 4, in the slot 406 (slot 0), an SSB 410 is transmitted in the symbols 4, 5, 6, 7 and an SSB 412 is transmitted in the symbols 8, 9, 10, 11, and in the slot 408 (slot 1), an SSB 414 is transmitted in the symbols 2, 3, 4, 5 and an SSB 416 is transmitted in the symbols 6, 7, 8, 9, and so on. The SSB may include a primary SS (PSS), a secondary (SSS), and a two symbol physical sidelink broadcast channel (PSBCH). The PSS and SSS may be used by UEs to establish sidelink communication (e.g., transmission and/or reception of data and/or control channels). The PSS may provide half-frame timing, the SS may provide cyclic prefix (CP) length and frame timing. The PBSCH carries some basic system information, such as system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), and other system information (OSI) can be transmitted on a physical sidelink shared channel (PSSCH) in certain subframes.

In NR, the basic subcarrier spacing is fixed in frequency range 1 (FR1) and FR2. For example, synchronization signal blocks (SSBs) can have subcarrier spacing (SCS) of 15 kHz or 30 kHz in FR1, and 120 kHz or 240 kHz in FR2. Thus, in order for a first UE to synchronize with second UE or a BS, that first UE must search one or both SCSs in each frequency range for the synchronization signal of the second UE or the BS. In the case of sidelink, the first UE has the option of requesting the sidelink synchronization signal block (S-SSB) numerology of the second UE from the BS.

However, the first UE generally does not have this option. For example, the first UE and the second UE may have different service cells, different service cell operators (e.g., AT&T, Verizon), and/or the first and second UEs may have varying levels of connection with their respective serving cells, including no connection at all (e.g., out of range). Moreover, 5G new radio (NR) supports a wide range of communication scenarios over multiple frequency ranges (e.g., FR1, FR2, and proposed or adopted FR3 and FR4), including millimeter wave (mmW) frequencies. To support these communication scenarios, the fixed numerology of LTE has been replaced with a scalable numerology with a relatively broader range of subcarrier spacing. Accordingly, the first UE may not be aware of the S-SSB numerology of the second UE, preventing the first UE from initiating sidelink communication. The solutions provided herein are directed to synchronization signals (e.g., S-SSB); however, it should be noted that the solutions can be applied to any suitable sidelink signaling between UEs.

Example Numerology Determination Process for in-Coverage UEs

A first UE (e.g., UE 124a), having cell coverage by a BS 110a (e.g., gNB 110a), may determine an S-SSB numerology of a second UE (e.g., UE 124b or UE 124c) by one or more of (i) an indication (explicit or implicit) of the S-SSB numerology provided by the BS 110a, (ii) a BS 110a SSB numerology, or (iii) a raster location of an access link SSB. In some examples, the S-SSB numerology is a function of one or more of explicit BS 110a indications (via SIB, SIB1, RRC, etc., depending on a mode of network signaling that the first UE 124a is in) and implicit indications (e.g., by derivation of a numerology from signaling received from the BS 110a or other UEs (e.g., UE 124b, 124c, or 124d of FIG. 1)) of numerologies of signals used on the access link or sidelink.

In some configurations, the first UE 124a may be within cell coverage of the BS 110a, and operating in one of an idle mode, a connected mode, or a partial in-coverage mode. For example, a UE operating in idle mode may be within range of a BS (i.e., the UE can receive broadcast messages transmitted by the BS) but does not have an established wireless communication link enabling bi-directional communication (e.g., access link) with the BS. In one example, referring to FIG. 1, the first UE 124a can receive broadcast messages over, for example, a physical broadcast channel (PBCH) including messages (e.g., master information block (MIB), system information blocks (SIB), paging signals, etc.) that contain reference signals (e.g., demodulation reference signals (DMRS), phase tracking reference signals (PTRS), sounding reference signals (SRS), channel state information reference signals (CSI-RS), etc.), and data (e.g., synchronization signals, SSB time index, etc.) from the BS 110a.

However, if the first UE 124a is in idle mode, the first UE does not have the access link established with the BS 110a. While in idle mode, the first UE 124a may utilize one or more of the reference signals and/or data it receives from the BS 110a broadcast to determine S-SSB numerology. These reference signals and/or data may be indicative of a network numerology for an access link between the UE 124a and the BS 110a (e.g., parameters required to decode SIB type 1 (SIB1) including one or more of an SSB offset, an SSB location, subcarrier spacing, and/or an explicit indicator). In some examples, the broadcast messages may include information and signaling configured to synchronize the first UE 124a with the BS 110a.

In one example, the SSB offset, SSB location, and/or subcarrier spacing for the access link are the same for sidelink. In this example, sidelink operations use the same numerology as the access link. In other examples, the sidelink operations use the same numerology as certain aspects of the access link. For instance, sidelink operations may use the same numerology as the BS 110a initial uplink bandwidth path. In this case, the UE 124a may receive the numerology from a SIB1. The first UE 124a may then determine a numerology provided by the BS 110a broadcast, and attempt to receive an S-SSB from the second UE using the determined numerology.

In another example, the explicit indicator provides an integer or a formula configured to allow the UE 124*a* to derive the S-SSB numerology as a function of the network numerology for the access link. In one example, the explicit indicator may include an integer that allows the UE 124*a* to determine S-SSB numerology by multiplying the access link SSB numerology by the integer. In some examples, the integer may vary based on one or more of service cell operators (e.g., AT&T, Verizon) or cell location, or may be a fixed value.

In another example, if the first UE 124*a* determines that it is in an idle mode of network signaling, the first UE may determine the SSB numerology based on the broadcast signaling (e.g., SIB) received from the BS. In this example, the broadcast signaling may include an explicit indicator of the SSB numerology, or a network numerology that the SSB numerology can be derived from.

In some configurations, the first UE 124*a* may be within cell coverage of the BS 110*a*, and operating in connected mode. A UE operating in connected mode is within range of a BS (i.e., the UE can receive broadcast messages (e.g., SIB), dedicated messages (e.g., SIB-1 and radio resource control (RRC)) transmitted by the BS) and has an established wireless, bi-directional communication link (e.g., access link) between the UE and the BS. For example, referring to FIG. 1, the first UE 124*a* is operating in connected mode with BS 110*a*.

In another example where the first UE 124*a* is operating in a connected mode, the first UE 124*a* may receive a dedicated message from the BS 110*a* containing one or more indications of an S-SSB numerology or a network numerology. The UE 124*a* may then determine the S-SSB numerology based on the one or more indications of the sidelink signaling numerology or the network numerology. The first UE 124*a* may determine the network numerology for an access link based on a broadcast message received from the BS 110*a*, and derive a first S-SSB numerology from the network numerology based on an explicit indicator. However, if the first UE 124*a* then receives the dedicated signaling containing a second S-SSB numerology, the first UE 124*a* may determine to use the second S-SSB numerology instead of the first S-SSB numerology.

In some examples, the first UE 124*a* may request S-SSB numerology of a second UE (e.g., 124*b* or UE 124*c*) from the BS 110*a*. In this example, the BS 110*a* may respond to the request with a radio resource control (RRC) message that explicitly indicates the S-SSB numerology of the second UE. In some cases, the UE 124*a* may receive, from the BS 110*a*, a dedicated message (e.g., an RRC message) that contains multiple indications of S-SSB numerology for the second UE. In this case, the first UE 124*a* may determine an S-SSB numerology by selecting one or more of the multiple indications of S-SSB numerology, or by simply using the S-SSB numerology provided if only one is provided in the dedicated message.

In some configurations, the first UE 124*a* may determine the S-SSB numerology based on one or more raster locations for SSBs in the access link between the first UE 124*a* and BS 110*a*. In general, a "raster" is a step size applied to the possible location of any signal or channel. For systems such as GSM, UMTS and LTE, a channel raster means a set of locations in the frequency domain, typically equally spaced, where the carrier center frequency can be located. A sidelink search and synchronization procedure thus involves a UE scanning a frequency range to detect carrier frequencies at which synchronization signals are transmitted by another UE. Thus, the distance between two consecutive places in a channel raster can be assumed as a step size when a terminal tries to search for the carrier frequency.

In 5G, however, it is not necessarily the case that the synchronization signals are located at the center frequency of the carrier. More generally, the raster location can be defined as a set of places in the frequency domain and within a frequency span at which a carrier can be found by a terminal, but such a place may or may not be the carrier center frequency. In some examples, the raster location indicates a step size from one possible location for an SSB to another possible location for an SSB.

Generally, raster locations are defined for UEs and BSs regardless of whether the UE or BS has an access link communication. In some examples, raster locations for SSBs in the access link may be the same locations for S-SSBs. However, in other examples, the first UE 124*a* may have to determine a unique S-SSB numerology based on the access link SSB raster locations.

In one example, the UE 124*a* offsets the access link raster location using one or more of a time domain and/or frequency domain offset. For example, if the access link raster location has 120 kHz sub-carrier spacing (SCS), the UE 124*a* may determine that the S-SSB also has 120 kHz SCS with an offset in one or more of a time domain and/or frequency domain relative to the access link timing and frequency respectively. Accordingly, sidelink raster locations may be expressed as a function of access link raster locations, where the function relates to an offset that is informed to the UE 124*a* by one or more of a pre-configuration of the UE 124*a* (e.g., by technical specification or standard), or a notification of the offset provided to the UE 124*a* by the BS 110*a* (e.g., via an RRC message or SIB1) or by a core network entity (e.g., via RRC message). Similarly, if sidelink raster locations are expressed as function of access link raster locations (e.g., via the offset in frequency), then S-SSB numerologies may also be expressed as a function of the numerologies used by the access link.

It should be noted that in 5G, some frequency ranges (e.g., FR1, FR2, FR3, FR4) may include multiple numerologies. For example, numerologies for access link over FR1 are 15 kHz and 30 kHz. In another example, numerologies for access link on another frequency range (e.g., FR3/FR4) may include 480 kHz, 960 kHz, and 3.84 MHz. In some configurations, sidelink communications may use the same numerologies based on access link raster locations. Thus, in some examples, the second UE (e.g., UE 124*b* or UE 124*c*) that is transmitting an S-SSB may determine one or more numerologies used by the access link for communicating S-SSB for sidelink. The second UE selects one or more of the numerologies at random, or based on the capabilities of one or more of the second UE or the first UE 124*a*. For example, one or more of the first UE 124*a* and the second UE may only support communication over certain numerologies. In such an example, if the second UE only transmits the S-SSB over supported numerologies, the frequency hypothesis the first UE 124*a* needs to search for the S-SSB may be reduced.

Figure 5:
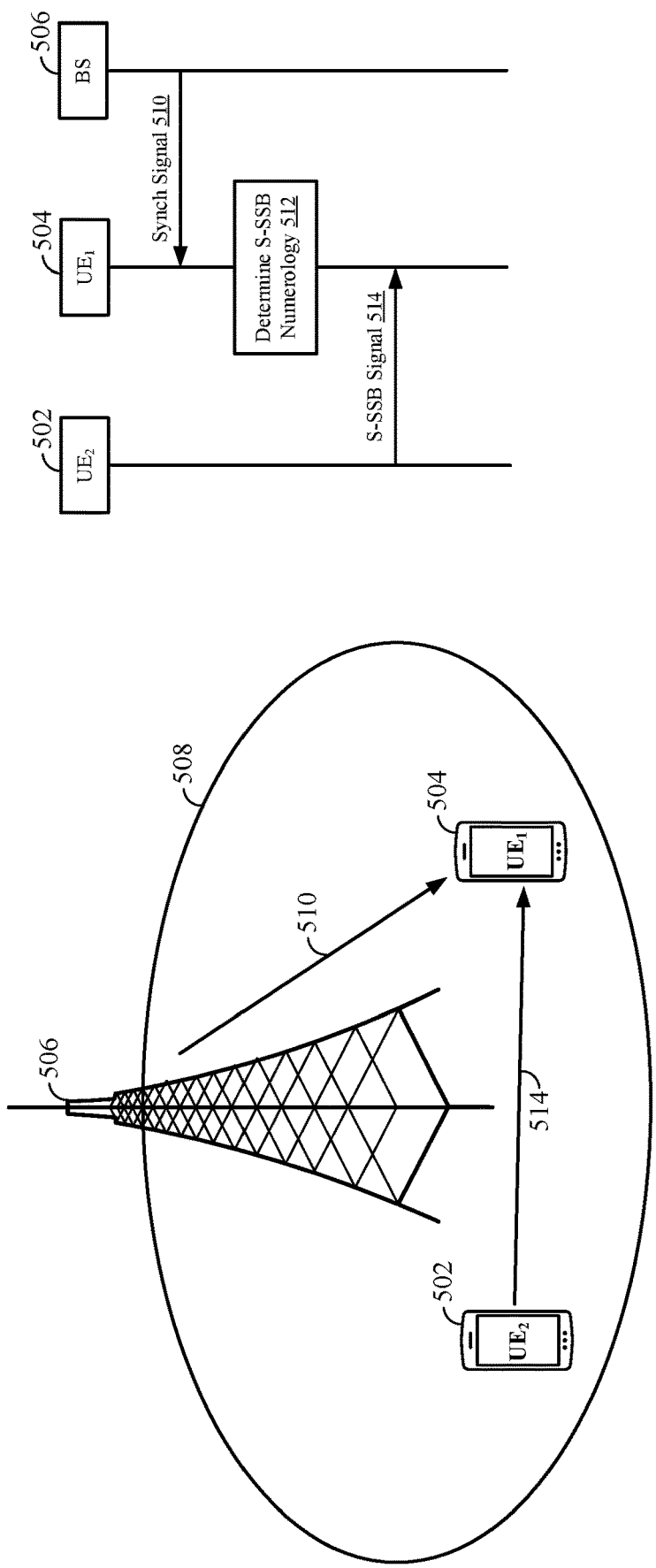
FIG. 5 is a diagram illustrating some exemplary in-coverage scenarios of numerology selection for sidelink communication in accordance with certain aspects of the present disclosure.

FIG. 5 is a diagram illustrating an exemplary in-coverage scenario for determining S-SSB numerology. For example, a first UE 504 and a second UE may be inside cell coverage 508. The first UE 504 may need to communicate with the second UE 502 using sidelink. If the first UE 504 is in a connected mode with the BS 506, then the BS may provide a signal indicating synchronization 510 that explicitly indicates the numerology for sidelink with the second UE 502. The signal indicating synchronization 510 may be communicated via an RRC message with one or more S-SSB numerologies that the first UE 504 may use for sidelink communication. The first UE 504 then determines an S-SSB numerology based on the signal indicating synchronization 510, and listens to the associated frequency. The first UE 504 may then receive the S-SSB signal 514 from the second UE 502 over the frequency associated with the determined S-SSB numerology. It should be noted that complementary techniques are also within the scope of this disclosure. For example, the first UE 504 may determine either a transmit S-SSB numerology or a receive S-SSB numerology. That is, the UE 504 may also transmit an S-SSB according to the transmit numerology for the second UE 502 to listen for.

If in an idle mode, the first UE 504 will receive a signal indicating synchronization 510 from the BS 506 in the form of a broadcast message (e.g., SIB, SIB1, MIB, etc.). The first UE 504 will then determine an SSB numerology 512 for initiating an access link between the first UE 504 and the BS 506 based on the signal indicating synchronization 510. In some configurations, the first UE 504 may determine the BS's 506 uplink bandwidth path numerology based on the signal indicating synchronization 510. The first UE 504 can then determine one or more S-SSB numerologies based on the SSB numerology and/or the uplink bandwidth path numerology. For example, the S-SSB numerology may be the same as the SSB numerology or the uplink bandwidth path numerology. In another example, the first UE 504 may multiply one or more of the SSB numerology or the uplink bandwidth path numerology by an integer to determine the S-SSB numerology. The first UE 504 then selects an S-SSB numerology based on the signal indicating synchronization 510, and listens to the associated frequency. The first UE 504 then receives the S-SSB signal 514 from the second UE 502 over the frequency associated with the selected S-SSB numerology.

Example Numerology Selection Process for Out-of-Coverage UEs

A third UE 124c, having no cell coverage (e.g., out of cell coverage of a BS 110a and BS 110b) may determine an S-SSB timing and/or numerology of another UE by one or more of: (i) a SynchRef UE, (ii) a preconfigured timing, and/or (iii) a raster location of a sidelink SSB.

In some configurations, the third UE 124c may be outside of cell coverage and unable to receive any signals indicating synchronization from the BS 110a. However, if the third UE 124c is within range of a SynchRef UE, then the third UE 124c may receive periodic signals indicating synchronization broadcast from the SynchRef UE. In this example, and referring to FIG. 1, any of the first UE 124a and a fourth UE 124d may be a SynchRef UE. According to some configurations, sidelink synchronization signals may include primary and secondary synchronization signals. In some examples, the synchronization signals may be based on NarrowBand IoT (NB-IoT) technology, such as may be considered or adopted by 3GPP. In other examples, the synchronization signals may be referred to variously as sidelink narrowband primary synchronization signals (SL-NPSS) or direct narrowband primary synchronization signals (DNPSS), sidelink narrowband secondary synchronization signals (SL-NSSS), direct narrowband secondary synchronization signal (DNSSS), primary/secondary sidelink synchronization signals (P-SLSS/S-SLSS), or in any other suitable manners.

In one example, the first UE 124a derives its sidelink synchronization signal timing from one or more of the BS 110a or another UE (e.g., UE 124b). The third UE 124c may receive sidelink signal broadcasts from the first UE 124a via a physical sidelink broadcast channel (PSBCH). In some cases, the sidelink signal broadcasts from the first UE 124a may indicate to the third UE 124c whether the first UE 124a is in or out of cell coverage. If the first UE 124a indicates that it is in cell coverage, then the third UE 124c will use the sidelink synchronization signal timing of the first UE 124a to search for an S-SSB of the first UE 124a and/or a fourth UE 124d that the third UE 124c desires to establish a sidelink communication with. It should be noted that the term "SyncRef" is relative to a UE. For example, the first UE 124a is a SyncRef UE for the third UE 124c if the third UE 124c derives its sidelink timing based on the first UE 124a. In this example, the UE 124a serves as SyncRef UE for UE 124c In another example, the fourth UE 124d is a SynchRef UE for UE 124c, but it is out of cell coverage and cannot derive its synchronization signal timing from a BS. In this example, the third UE 124c may use the synchronization signal timing of the fourth UE 124d to search for an S-SSB of the first UE 124a and/or the fourth UE 124d that the third UE 124c desires to establish a sidelink communication with. It should be noted however, that the synchronization signal of a UE in cell coverage is preferable in some cases.

In another example, the third UE 124c may not detect or may be out of range of a sidelink broadcast message from all UEs. In this example, the third UE 124c may determine its own sidelink synchronization signal timing. In some configurations, the third UE 124c may be pre-configured to utilize one or more particular synchronization signal timings adopted by 3GPP. In some configurations, the third UE 124c may be pre-configured by a service provider to utilize one or more particular synchronization signal timings (e.g., one or more particular synchronization signal timings for sidelink are programmed into a subscriber identification module (SIM) card). In some configurations, the third UE 124c may store one or more of a synchronization signal used by a BS while the third UE 124c was within cell coverage or a sidelink synchronization signal used by another UE when the third UE 124c was able to receive a sidelink broadcast signal. The third UE 124c will use the preconfigured or stored synchronization signal timing to search for an S-SSB of the first UE 124a and/or a fourth UE 124d that the third UE 124c desires to establish a sidelink communication with.

In some examples, the third UE 124c may determine a numerology for S-SSB base on raster locations. As noted previously, raster locations are defined for UEs and BSs regardless of whether the UE or BS has an access link communication. Thus, the third UE 124c includes knowledge of access link raster locations despite being out of cell coverage.

Similar to the example given above, the third UE 124c may offset an access link raster location using one or more of a time domain and/or frequency domain offset. Accordingly, sidelink raster locations may be expressed as a function of access link raster locations, where the function relates to an offset that is informed to the third UE 124c by one or more of a pre-configuration of the third UE 124c (e.g., by technical specification or standard), or a previous notification of the offset provided to the third UE 124c by a BS or by a core network entity.

It should be noted that in some cases, a UE may be partially within cell coverage. For example, the UE may be within range of a BS, but have poor measurement on reference signals from the BS. For example, the first UE 124a may determine that it is in a partially in-coverage mode if it determines that the reference signal received power (RSRP) or the reference signal received quality (RSRQ) from the BS is below a particular threshold. In one example, the third UE 124c may be partially within cell coverage, but may have poor measurement on reference signals from the BS 110a. In this example, the third UE 124c may use the numerology selection techniques described relating to either in-coverage UEs or out-of-coverage UEs.

In some examples, whether the first UE 124a is in an out-of-coverage mode (e.g., disconnected or out of range of a cell signal) or an in-coverage mode (e.g., connected, idle, partially connected) of network signaling, the first UE 124a may select one or more raster locations from a synchronization raster, each of the one or more raster locations comprising one or more indications of frequency locations of SSBs configured to synchronize the first UE to the BS for network communication. The first UE 124a may then determine an S-SSB numerology by offsetting the one or more raster locations by a frequency offset to generate one or more locations of S-SSBs configured to synchronize the first UE 124a to another UE (e.g., the third UE 124c) for sidelink communication. Here, the first UE 124a determines where in frequency the S-SSB should be sent. For example, the first UE 124a derives allowed frequency locations that the S-SSB can be communicated over by applying an offset to the access network SSB frequency locations.

Figure 6:
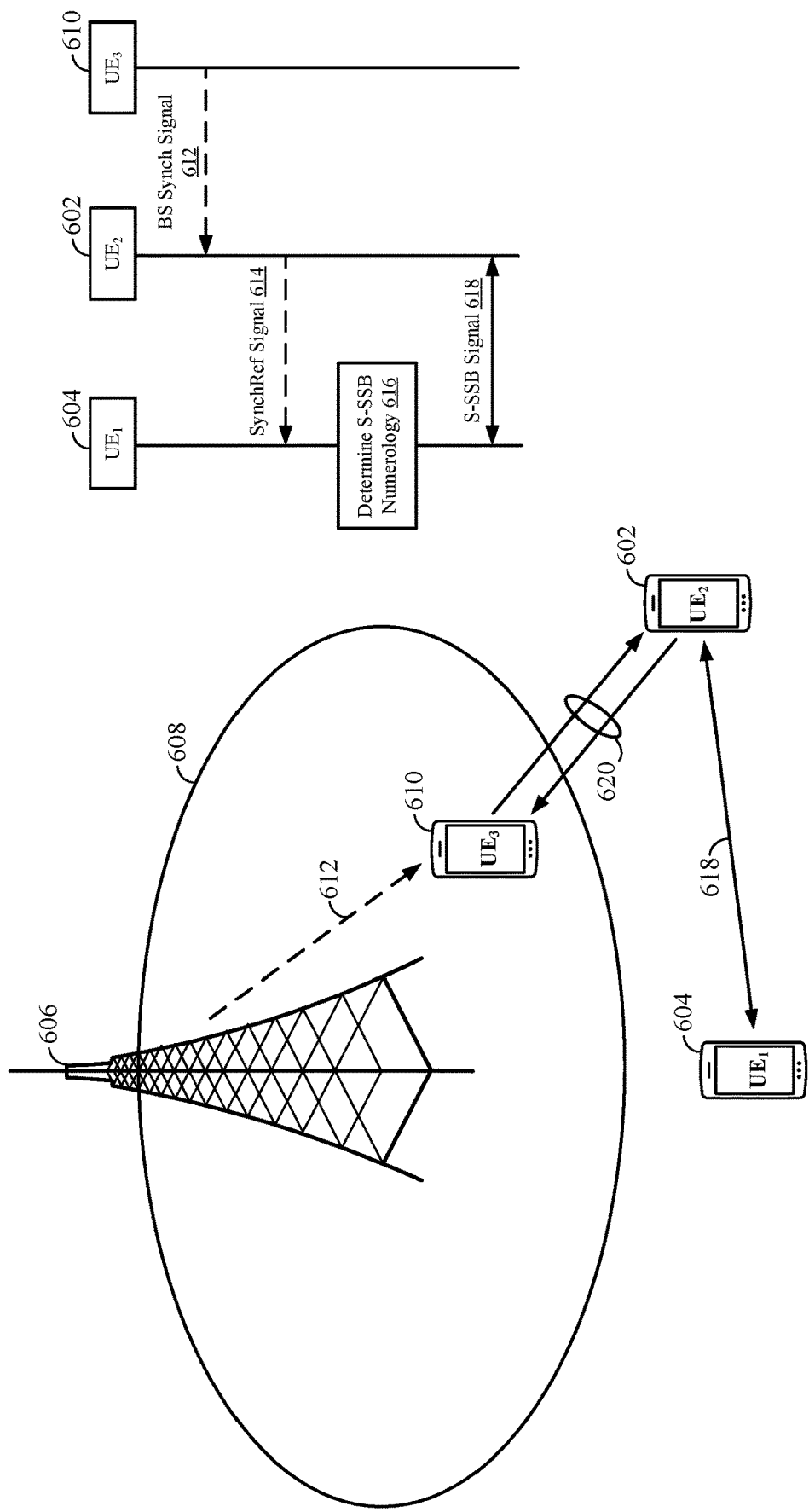
FIG. 6 is a diagram illustrating some exemplary out-of-coverage scenarios of numerology selection for sidelink communication in accordance with certain aspects of the present disclosure.

FIG. 6 is a diagram illustrating an exemplary out-of-coverage scenario for determining S-SSB numerology. In one example, a first UE 604 may need to communicate with a second UE 602 using sidelink. However, both the first UE 604 and the second UE 602 are outside of cell coverage 608. In this example, the second UE 602 is a SynchRef UE and is transmitting over a sidelink communication 620 with a third UE 610. Accordingly, the second UE 602 is broadcasting sidelink signals indicating whether the second UE 602 is in coverage or out of coverage. It should be noted that communication of sidelink signals may be facilitated using one or more sidelink channels, such as a physical sidelink broadcast channel (PSBCH), a physical sidelink discovery channel (PSDCH), a physical sidelink shared channel (PSSCH), and a physical sidelink control channel (PSCCH). In this example, the second UE 602 will indicate that is it outside of cell coverage 608. However, if the first UE 604 is unable to find another UE that is within cell coverage 608, the first UE 604 will utilize the second UE 602 to derive sidelink synchronization timing. In this example, the first UE receives SyncRef signals 614 being broadcast from the second UE 602 and derives S-SSB timing based on the SynchRef signals 614. In some cases, the SyncRef signals 614 may be related to the timing of a BS 606 signal indicating synchronization 612.

In another scenario, the second UE 602 is within cell coverage, and is a SynchRef UE. In this scenario, the first UE 604 receives an indication form the second UE 602 that the second UE 602 is within cell coverage 608. Thus, the timing of the SynchRef signals 614 could be related to the timing of signals indicating synchronization 612 of the BS 606. In this scenario, the first UE 604 will prefer the timing of the SynchRef signals 614 over signals of another UE that is out of cell overage 608.

In another scenario, both the first UE 604 and the second UE 602 are outside of cell coverage 608, and neither the first UE 604 nor the second UE 602 have an active sidelink communication. In this scenario, the first UE 604 picks its own timing based on a previous sidelink communication or a previous access link communication. In some configurations, the timing may be preconfigured according to a wireless standard such as 3GPP or a wireless service provider, and may be stored in the first UE 604. In this configuration, the first UE 604 determines an S-SSB numerology 616 based on the previous timing or the preconfigured timing, and proceeds to transmit an S-SSB signal 618 according to the timing, or listens for an S-SSB signal 618 from the second UE 602 according to the timing.

In another scenario, the first UE 604 determines S-SSB numerology 616 based on one or more known raster locations. An S-SSB numerology may be determined as a function of access link raster locations, where the function relates to an offset that is informed to the first UE 604 by one or more of a pre-configuration (e.g., by technical specification, standard, or service provider), or a previous notification of the offset provided by a BS or by a core network entity.

Figure 7:
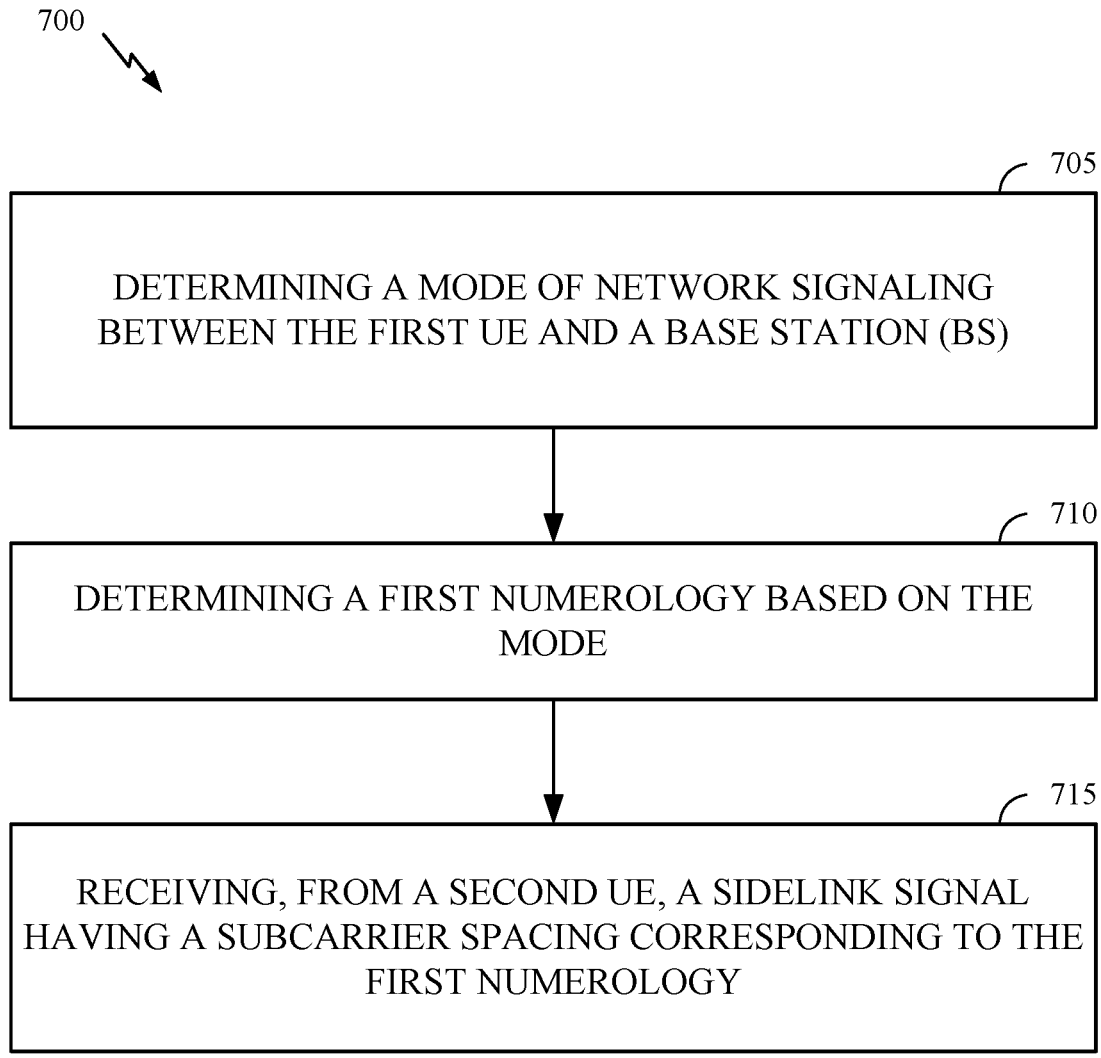
FIG. 7 is a flow chart illustrating a method of selecting numerology for sidelink communication, in accordance with certain aspects of the present disclosure.

FIG. 7 is a flow diagram illustrating example operations 700 for wireless communication, in accordance with certain aspects of the present disclosure. The operations 700 may be performed, for example, using any of the UEs as described in relation to FIGS. 1-3, 5, and 6. Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at block 705, by determining a mode of network signaling between the first UE and a base station (BS). In some examples, the mode of network signaling may include an idle mode, a connected mode, and in-coverage, out-of coverage, or a partially in-coverage mode of the first UE. In the idle mode, the first UE may be limited to receiving broadcast messages from the BS. In the connected mode, the UE may communicate over an access link with the BS. Partially in-coverage mode may correspond to a limited number of visible BS beams and/or a relatively weak reference signal received power (RSRP). For example, determining the mode of network signaling may be based on one or more of the RSRP corresponding to the network signaling between the UE and the BS, or whether a limited number BS beams are visible to the first UE. A UE in such a partially in-coverage mode may follow the rules described herein for either the in-coverage UEs or the out-of-coverage UEs.

In some examples, the determined mode of network signaling is a disconnected mode wherein the BS is out of range (e.g., an out-of-coverage mode). In such an example, selecting the first numerology includes deriving a subcarrier spacing from a broadcast signal received from a second UE over a physical sidelink broadcast channel (PSBCH). However, in some configurations, selecting the first numerology includes retrieving one or more indications of sidelink numerology from a memory device, wherein the one or more indications of sidelink numerology are configured to synchronize the first UE to the second UE for sidelink communication.

At block 710, the operations 700 proceed by determining a first numerology based on the mode. For example, if the determined mode is partially connected, then determine the first numerology may be based on one or more of preconfigured synchronization signal timing or a raster location. In another example, if the determined mode is an idle mode, the operation may determine the first numerology from one or more indications of network numerology that are received from a BS in a broadcast message that are configured to synchronize the first UE to the BS. In some examples, the broadcast message may include a system information block (SIB).

In another example, if the determined mode is connected mode, then determining the first numerology may be based on one or more indications of sidelink signaling numerology received from the BS in a dedicated message over an access link. In this example, the indications of sidelink signaling numerology are configured to synchronize the first UE to the second UE. In some examples, the dedicated message includes an RRC message.

In some examples, the first numerology may be determined based on a synchronization raster that includes one or more indications of a network numerology configured to synchronize the first UE to the BS for network communication (e.g., access link). However, in some examples, the synchronization raster may include indications of S-SSBs configured to synchronize the first UE to another UE for sidelink communication.

In some examples, the first numerology may be determined from one or more raster locations from the synchronization raster which includes one or more indications of frequency locations of SSBs configured to synchronize the first UE to the BS for network communication. In this example, the operation 700 may offset the one or more raster locations by a frequency offset to generate one or more locations of S-SSBs configured to synchronize the first UE to another UE for sidelink communication. The operation 700 may then determine the first numerology based on a numerology associated with the one or more locations of S-SSBs.

At block 715, the operation 700 proceeds to receiving, from a second UE, a sidelink signal having a subcarrier spacing corresponding to the first numerology. In some examples, the received sidelink signal includes an S-SSB. In some examples, the sidelink signal includes one or more of a primary sidelink synchronization signal (P-SLSS), a secondary sidelink synchronization signal (S-SLSS), or a physical sidelink broadcast channel (PSBCH) signal, wherein the P-SLSS, the S-SLSS, and the PSBCH signals are configured to synchronize the first UE to the second UE.

In certain aspects, the sidelink signal comprises sidelink synchronization signaling block (S-SSB).

In certain aspects, the sidelink signal includes one or more of a primary sidelink synchronization signal (P-SLSS), a secondary sidelink synchronization signal (S-SLSS), or a physical sidelink broadcast channel (PSBCH) signal, wherein the P-SLSS, the S-SLSS, and the PSBCH signals are configured to synchronize the first UE to the second UE.

In certain aspects, determining the mode of network signaling between the first UE and the BS further comprises determining the first UE is in a partially in-coverage mode of network signaling, wherein the determining the first UE is in the partially in-coverage mode is based on one or more of: (i) a reference signal received power (RSRP) corresponding to the network signaling between the first UE and the BS, or (ii) a limited number BS beams visible to the first UE.

In certain aspects, determining the mode of network signaling between the first UE and the BS further comprises determining the first UE is in an idle mode of network signaling, the method further comprising receiving, from the BS, a broadcast message comprising an explicit indicator of the first numerology.

In certain aspects, wherein the broadcast message is a system information block (SIB).

In certain aspects, determining the mode of network signaling between the first UE and the BS further comprises determining the first UE is in a connected mode of network signaling, the method further comprising: receiving, from the BS, a dedicated message comprising one or more indications of a sidelink signaling numerology or a network numerology; and wherein determining the first numerology comprises selecting the first numerology from the one or more indications of the sidelink signaling numerology or the network numerology.

In certain aspects, the dedicated message comprising the one or more indications of the sidelink signaling numerology is a radio resource control (RRC) message; and the dedicated message comprising the one or more indications of the network numerology is a system information block-1 (SIB-1).

In certain aspects, the dedicated message consists of the sidelink signaling numerology, the method further comprising: determining the network numerology for an access link based on a broadcast message received from the BS, the network numerology configured to synchronize the first UE to the BS; deriving another sidelink signaling numerology from the network numerology based on an explicit indicator; and wherein determining the first numerology comprises selecting the sidelink signaling numerology instead of the other sidelink signaling numerology.

In certain aspects, the indications of sidelink signaling numerology are configured to synchronize the first UE to the second UE; and the indications of the network numerology are configured to synchronize the first UE to the BS for network communication and synchronize the first UE to the second UE for sidelink communication.

In certain aspects, the operation 700 may also include selecting one or more raster locations from a synchronization raster, each of the one or more raster locations comprising one or more indications of frequency locations of synchronization signal blocks (SSBs) configured to synchronize the first UE to the BS for network communication; and offsetting the one or more raster locations by a frequency offset to generate one or more locations of sidelink synchronization signal blocks (S-SSBs) configured to synchronize the first UE to the second UE for sidelink communication.

Figure 8:
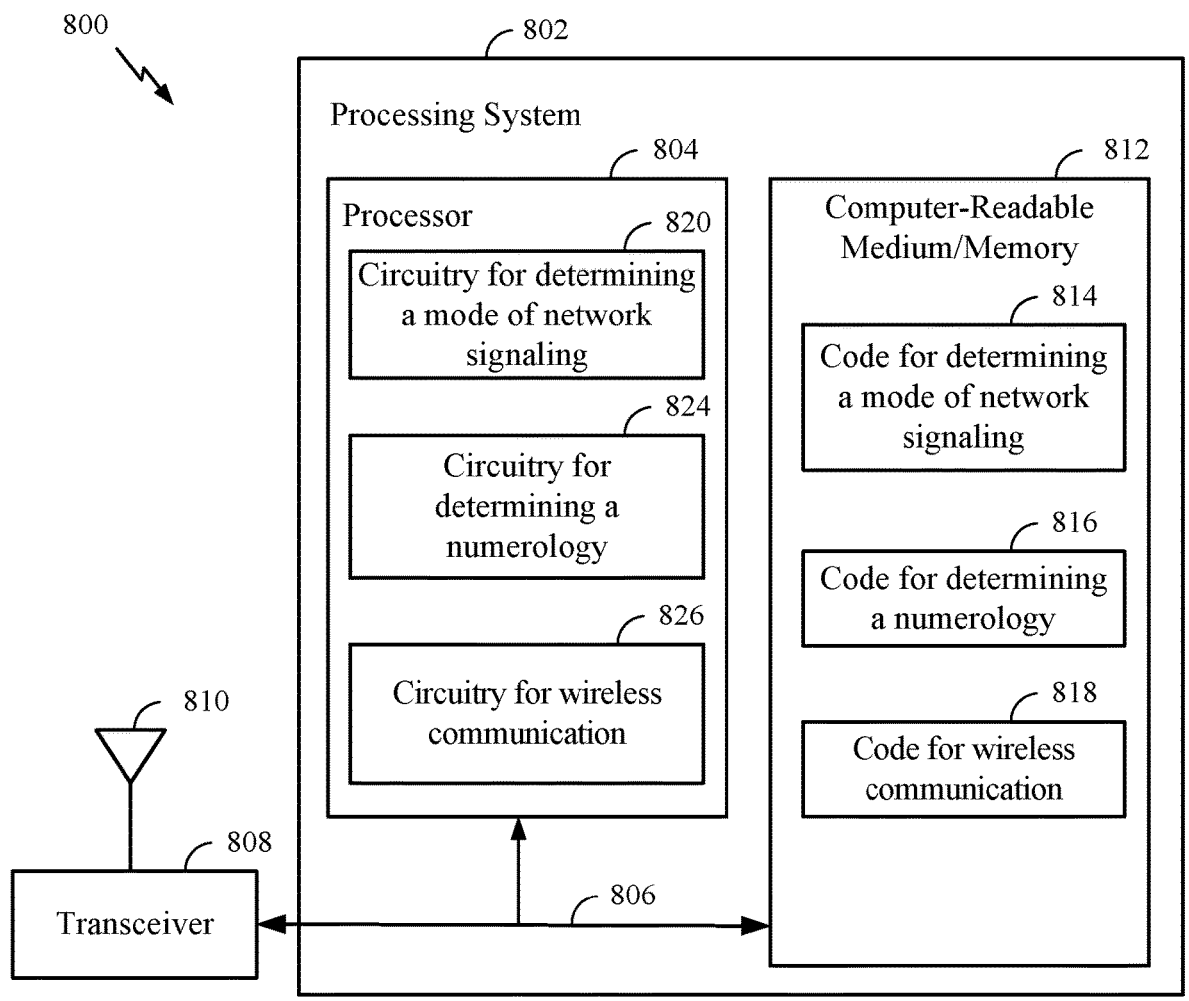
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIGS. 5-7. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIGS. 5-7, or other operations for performing the various techniques discussed herein. In certain aspects, computer-readable medium/memory 812 stores code for determining a mode of network signaling 814. The computer-readable medium/memory 812 may also store code for determining numerology 816. The computer-readable medium/memory 812 may also store code for wireless communication 818.

In certain aspects, the processor 804 has circuitry configured to implement the code stored in the computer-readable medium/memory 1012. The processor 804 includes circuitry for determining a mode of network signaling 820. The circuitry for determining a mode of network signaling 820 may operate in coordination with the code for determining a mode of network signaling 814. The processor 804 includes circuitry for determining numerology 824. The circuitry for determining numerology 824 may operate in coordination with the code for determining numerology 816.

The processor includes circuitry for wireless communication 826. The circuitry for wireless communication 826 may include one or more hardware components that provide the physical structure that performs various processes related to wireless communication (e.g., signal reception and/or signal transmission) as described herein. The circuitry for wireless communication 826 may operate in coordination with the code for wireless communication 818.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. For example, determining a numerology may include a UE determining a numerology using signaling that the UE can receive based on its mode of network signaling. For example, if the UE is out-of-coverage (e.g., no cell coverage), then one option the UE may have for determining an S-SSB numerology is to listen for a PBSCH from another UE nearby, and determine the S-SSB numerology based on a received PBSCH signal. In other words, the network signaling mode of the UE may dictate the types of signaling that the UE can use to determine S-SSB numerology.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 5-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of sidelink communication at a first user equipment (UE), comprising:
    determining a first numerology is associated with sidelink communication signaling with a second UE by deriving the first numerology based on at least a subcarrier spacing of a broadcast signal received from the second UE over a physical sidelink broadcast channel (PSBCH) and based on one or more sidelink raster locations expressed as a function of one or more access link raster locations, the subcarrier spacing being associated with the one or more sidelink raster locations and the one or more access link raster locations; and
    listening to a frequency associated with the first numerology for a sidelink signal from the second UE.

2. The method of claim 1, wherein the sidelink signal comprises a sidelink synchronization signaling block (S-SSB).

3. The method of claim 1, wherein the sidelink signal includes one or more of a primary sidelink synchronization signal (P-SLSS), a secondary sidelink synchronization signal (S-SLSS), or a PSBCH signal, wherein the one or more of the P-SLSS, the S-SLSS, or the PSBCH signal are configured to synchronize the first UE to the second UE.

4. The method of claim 1, further comprising:
    selecting the one or more access link raster locations from a synchronization raster, each of the one or more access link raster locations comprising one or more indications of frequency locations of synchronization signal blocks (SSBs) configured to synchronize the first UE to a base station (BS) for network communication; and
    offsetting the one or more access link raster locations by a frequency offset to generate one or more locations of sidelink synchronization signal blocks (S-SSBs) configured to synchronize the first UE to the second UE.

5. The method of claim 1, further comprising determining a mode of network signaling between the first UE and a base station (BS) is an out-of-coverage mode of network signaling, wherein determining the first numerology is in response to determining the mode.

6. The method of claim 1, wherein the one or more sidelink raster locations are associated with the sidelink signal and the one or more access link raster locations are associated with the broadcast signal.

7. A first user equipment (UE), comprising:
a memory; and
a processor coupled to the memory, the processor and the memory configured to cause the first UE to:
determine a first numerology is associated with sidelink communication with a second UE by deriving the first numerology based on at least a subcarrier spacing of a broadcast signal received from the second UE over a physical sidelink broadcast channel (PSBCH) and based on one or more sidelink raster locations expressed as a function of one or more access link raster locations, the subcarrier spacing being associated with the one or more sidelink raster locations and the one or more access link raster locations; and
listen to a frequency associated with the first numerology for a sidelink signal from the second UE.

8. The first UE of claim 7, wherein the sidelink signal comprises a sidelink synchronization signaling block (S-SSB).

9. The first UE of claim 7, wherein the sidelink signal includes one or more of a primary sidelink synchronization signal (P-SLSS), a secondary sidelink synchronization signal (S-SLSS), or a PSBCH signal, wherein the one or more of the P-SLSS, the S-SLSS, or the PSBCH signal are configured to synchronize the first UE to the second UE.

10. The first UE of claim 7, wherein the processor and the memory are further configured to cause the first UE to:
select the one or more access link raster locations from a synchronization raster, each of the one or more access link raster locations comprising one or more indications of frequency locations of synchronization signal blocks (SSBs) configured to synchronize the first UE to a base station (BS) for network communication; and
offset the one or more access link raster locations by a frequency offset to generate one or more locations of sidelink synchronization signal blocks (S-SSBs) configured to synchronize the first UE to the second UE.

11. The first UE of claim 7, wherein the processor and the memory are further configured to cause the first UE to determine a mode of network signaling between the first UE and a base station (BS) is an out-of-coverage mode of network signaling, wherein the processor and the memory are configured to cause the first UE to determine the first numerology in response to determining the mode.

12. The first UE of claim 7, wherein the one or more sidelink raster locations are associated with the sidelink signal and the one or more access link raster locations are associated with the broadcast signal.

13. A non-transitory computer-readable storage medium that stores instructions that when executed by a first user equipment (UE) cause the first UE to perform operations for sidelink communication, the operations comprising:
determining a first numerology is associated with sidelink communication signaling with a second UE by deriving the first numerology based on at least a subcarrier spacing of a broadcast signal received from the second UE over a physical sidelink broadcast channel (PSBCH) and based on one or more sidelink raster locations expressed as a function of one or more access link raster locations, the subcarrier spacing being associated with the one or more sidelink raster locations and the one or more access link raster locations; and
listening to a frequency associated with the first numerology for a sidelink signal from the second UE.

14. The non-transitory computer-readable storage medium of claim 13, wherein the sidelink signal comprises a sidelink synchronization signaling block (S-SSB).

15. The non-transitory computer-readable storage medium of claim 13, wherein the sidelink signal includes one or more of a primary sidelink synchronization signal (P-SLSS), a secondary sidelink synchronization signal (S-SLSS), or a PSBCH signal, wherein the one or more of the P-SLSS, the S-SLSS, or the PSBCH signal are configured to synchronize the first UE to the second UE.

16. The non-transitory computer-readable storage medium of claim 13, wherein the operations further comprise:
selecting the one or more access link raster locations from a synchronization raster, each of the one or more access link raster locations comprising one or more indications of frequency locations of synchronization signal blocks (SSBs) configured to synchronize the first UE to a base station (BS) for network communication; and
offsetting the one or more access link raster locations by a frequency offset to generate one or more locations of sidelink synchronization signal blocks (S-SSBs) configured to synchronize the first UE to the second UE.

17. The non-transitory computer-readable storage medium of claim 13, wherein the one or more sidelink raster locations are associated with the sidelink signal and the one or more access link raster locations are associated with the broadcast signal.

18. A first user equipment (UE), comprising:
means for determining a first numerology is associated with sidelink communication signaling with a second UE by deriving the first numerology based on at least a subcarrier spacing of a broadcast signal received from the second UE over a physical sidelink broadcast channel (PSBCH) and based on one or more sidelink raster locations expressed as a function of one or more access link raster locations, the subcarrier spacing being associated with the one or more sidelink raster locations and the one or more access link raster locations; and
means for listening to a frequency associated with the first numerology for a sidelink signal from the second UE.

19. The first UE of claim 18, wherein the sidelink signal comprises a sidelink synchronization signaling block (S-SSB).

20. The first UE of claim 18, wherein the sidelink signal includes one or more of a primary sidelink synchronization signal (P-SLSS), a secondary sidelink synchronization signal (S-SLSS), or a PSBCH signal, wherein the one or more of the P-SLSS, the S-SLSS, or the PSBCH signal are configured to synchronize the first UE to the second UE.

21. The first UE of claim 18, further comprising:
means for selecting the one or more access link raster locations from a synchronization raster, each of the one or more access link raster locations comprising one or more indications of frequency locations of synchronization signal blocks (SSBs) configured to synchronize the first UE to a base station (BS) for network communication; and means for offsetting the one or more access link raster locations by a frequency offset to generate one or more locations of sidelink synchronization signal blocks (S-SSBs) configured to synchronize the first UE to the second UE.

22. The first UE of claim 18, wherein the one or more sidelink raster locations are associated with the sidelink signal and the one or more access link raster locations are associated with the broadcast signal.

\* \* \* \* \*